United States Patent
Cun (10) Patent No.: US 10,493,861 B2
(45) Date of Patent: Dec. 3, 2019

(54) SYSTEM AND METHOD FOR DETERMINING HYDROGEN PRODUCTION TO PROVIDE ENERGY TO AT LEAST ONE VEHICLE

(71) Applicant: Honda Motor Co., Ltd., Tokyo (JP)

(72) Inventor: David Wong Cun, Fountain Valley, CA (US)

(73) Assignee: Applicant: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/898,854

(22) Filed: Feb. 19, 2018

(65) Prior Publication Data

US 2019/0255952 A1    Aug. 22, 2019

(51) Int. Cl.
| | |
|---|---|
| *B60L 53/30* | (2019.01) |
| *F02D 19/06* | (2006.01) |
| *F17C 11/00* | (2006.01) |
| *F17C 5/00* | (2006.01) |
| *F17C 13/02* | (2006.01) |

(52) U.S. Cl.
CPC .......... *B60L 53/30* (2019.02); *F02D 19/0644* (2013.01); *F17C 5/007* (2013.01); *F17C 11/005* (2013.01); *F17C 13/028* (2013.01); *F17C 2221/012* (2013.01); *F17C 2265/065* (2013.01); *F17C 2270/0139* (2013.01)

(58) Field of Classification Search
CPC .... B60L 11/1824; B60L 53/30; F17C 13/028; F17C 2265/065; F17C 5/007; F17C 2270/0139; F17C 11/005; F17C 2221/012; F02D 19/0644
See application file for complete search history.

(56) References Cited

U.S. PATENT DOCUMENTS

| | | |
|---|---|---|
| 6,945,345 B2 | 9/2005 | Meaney, Jr. |
| 7,248,018 B2 | 7/2007 | Sanders et al. |
| 7,523,770 B2 | 4/2009 | Horowitz et al. |
| 7,980,344 B2 | 7/2011 | Kubo et al. |
| 8,019,445 B2 | 9/2011 | Marhoefer |
| 8,042,631 B2 | 10/2011 | Grieve et al. |
| 8,442,700 B2 | 5/2013 | Anderson |
| 9,365,127 B2 | 6/2016 | Olsson |

(Continued)

FOREIGN PATENT DOCUMENTS

WO    02103833    12/2002

OTHER PUBLICATIONS

International Search Report and Written Opinion of PCT/US2018/058617, 13 pages.

*Primary Examiner* — Ziaul Karim
(74) *Attorney, Agent, or Firm* — Rankin, Hill & Clark LLP (57) ABSTRACT

A system and method for determining hydrogen production to provide energy to at least one vehicle that include determining that at least one vehicle is arriving towards a vehicle energy station. The system and method also include determining if the vehicle energy station includes a sufficient amount of hydrogen to refuel the at least one vehicle arriving towards the vehicle energy station. The system and method further include controlling production of hydrogen by the vehicle energy station if it is determined that the vehicle energy station includes an insufficient amount of hydrogen to refuel the at least one vehicle arriving towards the vehicle energy station.

18 Claims, 4 Drawing Sheets

(56) References Cited

U.S. PATENT DOCUMENTS

| | | | |
|---|---|---|---|
| 9,365,131 B2 | 6/2016 | Jamal et al. | |
| 2002/0174798 A1* | 11/2002 | Kumar | B60L 7/12 |
| | | | 105/50 |
| 2003/0083848 A1* | 5/2003 | Kami | F17C 5/007 |
| | | | 702/187 |
| 2004/0031388 A1 | 2/2004 | Hsu | |
| 2005/0005814 A1* | 1/2005 | Kumar | B60K 6/28 |
| | | | 105/35 |
| 2005/0276749 A1* | 12/2005 | Noujima | C01B 3/02 |
| | | | 423/658.2 |
| 2008/0217998 A1* | 9/2008 | Parmley | H02J 1/10 |
| | | | 307/65 |
| 2009/0114463 A1* | 5/2009 | DeVault | B60K 6/365 |
| | | | 180/65.29 |
| 2011/0060521 A1* | 3/2011 | Watkins | G01C 21/3469 |
| | | | 701/469 |
| 2011/0200193 A1* | 8/2011 | Blitz | H04L 9/3271 |
| | | | 380/277 |
| 2015/0175011 A1 | 6/2015 | Hung et al. | |
| 2016/0359214 A1 | 12/2016 | Barton | |

* cited by examiner

SYSTEM AND METHOD FOR DETERMINING HYDROGEN PRODUCTION TO PROVIDE ENERGY TO AT LEAST ONE VEHICLE

BACKGROUND

Some hydrogen energy providing stations may need to have a predetermined amount of hydrogen on hand to provide hydrogen to a plurality of hydrogen fuel cell vehicles that may utilize the stations for receiving energy. In many cases, the stations may have to order hydrogen to be delivered to the stations based simply on an expected demand by the plurality of vehicles. Therefore, the amount of hydrogen on hand may be static in nature and may not account for an increase or decrease in demand for hydrogen to provide energy to the plurality of vehicles. Thus, in some circumstances when demand for hydrogen energy is lower than the predetermined amount, the hydrogen energy providing stations may end up storing an unnecessary surplus of hydrogen. In other circumstances, when the demand for hydrogen energy is lower than the predetermined amount, the hydrogen energy providing stations may end up with a shortage of hydrogen.

BRIEF DESCRIPTION

According to one aspect, a computer-implemented method for determining hydrogen production to provide energy to at least one vehicle that includes determining that at least one vehicle is arriving towards a vehicle energy station. The computer-implemented method also includes determining if the vehicle energy station includes a sufficient amount of hydrogen to refuel the at least one vehicle arriving towards the vehicle energy station, wherein determining if the vehicle energy station includes the sufficient amount of hydrogen includes determining a current level of hydrogen stored within a hydrogen storage of vehicle energy station. The computer-implemented method further includes controlling production of hydrogen by the vehicle energy station if it is determined that the vehicle energy station includes an insufficient amount of hydrogen to refuel the at least one vehicle arriving towards the vehicle energy station.

According to another aspect, a system for determining hydrogen production to provide energy to at least one vehicle that includes a memory storing instructions when executed by a processor cause the processor to determine that at least one vehicle is arriving towards a vehicle energy station. The instructions also cause the processor to determine if the vehicle energy station includes a sufficient amount of hydrogen to refuel the at least one vehicle arriving towards the vehicle energy station, wherein determining if the vehicle energy station includes the sufficient amount of hydrogen includes determining a current level of hydrogen stored within a hydrogen storage of vehicle energy station. The instructions further includes control production of hydrogen by the vehicle energy station if it is determined that the vehicle energy station includes an insufficient amount of hydrogen to refuel the at least one vehicle arriving towards the vehicle energy station.

According to still another aspect, a computer readable storage medium storing instructions that when executed by a computer, which includes at least a processor, causes the computer to perform a method that includes determining that at least one vehicle is arriving towards a vehicle energy station. The instructions also include determining if the vehicle energy station includes a sufficient amount of hydrogen to refuel the at least one vehicle arriving towards the vehicle energy station, wherein determining if the vehicle energy station includes the sufficient amount of hydrogen includes determining a current level of hydrogen stored within a hydrogen storage of vehicle energy station. The instructions further include controlling production of hydrogen by the vehicle energy station if it is determined that the vehicle energy station includes an insufficient amount of hydrogen to refuel the at least one vehicle arriving towards the vehicle energy station.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
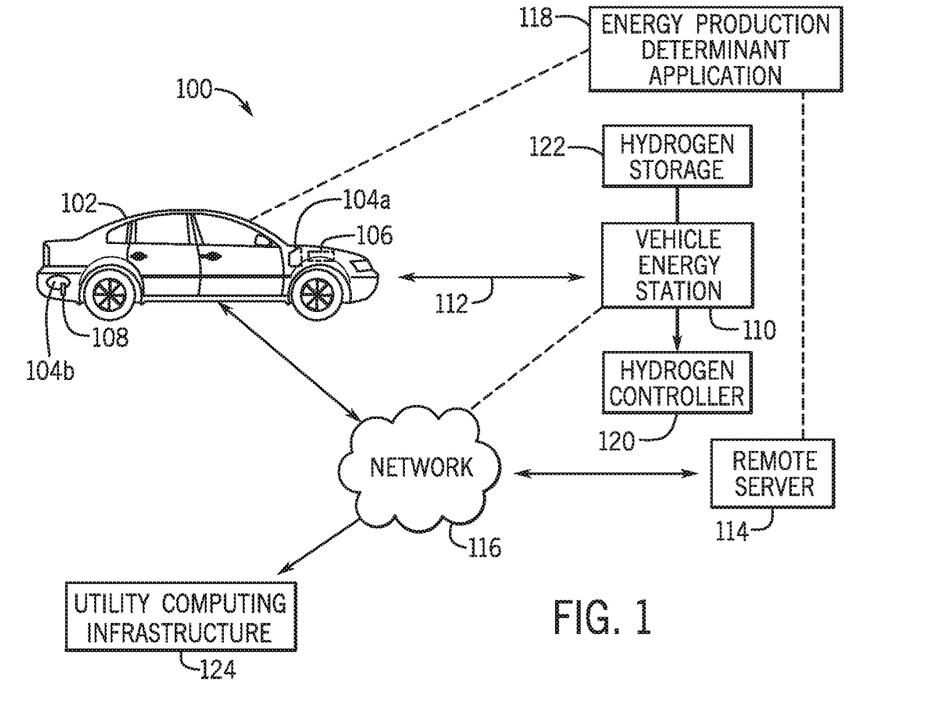
FIG. 1 is a high-level schematic view of an illustrative system for determining hydrogen production to provide energy to at least one vehicle according to an exemplary embodiment of the present disclosure.

Referring now to the drawings, wherein the showings are for purposes of illustrating one or more exemplary embodiments and not for purposes of limiting the same, FIG. 1 is a high-level schematic view of an illustrative system 100 for determining hydrogen production to provide energy to at least one vehicle according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes one or more vehicles 102. The vehicle(s) 102 may be configured as one or more electric vehicles (EV) or one or more hydrogen fuel cell vehicles (HFCV). In one embodiment, when configured as an EV(s), the vehicle(s) 102 is powered by an electric motor 106 and an electric storage mechanism, for example, a battery 104a. In one configuration, when configured as the EV(s), the vehicle(s) 102 is purely electric in that it is fully operational based on the operation of the electric motor 106. In other embodiments, the vehicle(s) 102 may have the electric motor 106 and an internal combustion engine (not shown). In some embodiments, the EV(s) may have any number of electric motors, batteries, and/or internal combustion engines and they may operate in series (e.g., as in an extended range electric vehicle), in parallel, or some combination of series and parallel operation.

In one embodiment, when configured as the HFCV(s), the vehicle(s) 102 is powered by one or more motors (not shown) that are operably connected to a fuel cell (not shown) that is provided hydrogen from a hydrogen storage tank 104b to be used as onboard fuel for motive power. The hydrogen storage tank 104b may include a hydrogen storage sensor 108 that is configured to sense a level (e.g., volume) of hydrogen that is stored within the hydrogen storage tank 104b. The hydrogen storage sensor 108 may provide the sensed level of hydrogen to one or more internal components of the vehicle(s) 102 and/or external components of the system 100.

In an exemplary embodiment, the system 100 may include a vehicle energy station 110 that may be utilized to provide energy to the vehicle(s) 102 via an energy link 112. In one embodiment, the vehicle energy station 110 may be configured as a hydrogen-electric charging station that may be operable to distribute compressed hydrogen and electrical current to the vehicle(s) 102 based on a category of the vehicle(s) 102. In other words, the vehicle energy station 110 may be configured to distribute hydrogen or electricity based on if the category of the vehicle(s) 102 is the HFCV(s) or the EV(s). In alternate embodiments, the vehicle energy station 110 may also be configured to provide additional fuels, including, but not limited to, petroleum, natural gas, bio-diesel, bio-alcohol, propane, and the like.

In one or more embodiments, the vehicle energy station 110 may be configured to provide energy to the vehicle(s) 102 configured as HFCV(s) by supplying an amount of hydrogen to the vehicle(s) 102 through the energy link 112. In one embodiment, the energy link 112 may be configured as a hydrogen supplying conduit that may be connected to provide hydrogen fuel directly to the hydrogen storage tank 104b. The vehicle energy station 110 may additionally be configured to connect to the vehicle(s) 102 configured as the EV(s) via the energy link 112. In particular, the vehicle energy station 110 may be utilized to charge the battery 104a of the vehicle(s) 102 through the energy link 112 that may be configured as a charging connector that is configured to connect direct to the vehicle(s) 102.

In one or more embodiments, the vehicle energy station 110 may be configured to produce (e.g., generate) hydrogen on-site based on one or more commands that are provided by a hydrogen controller 120. In particular, the hydrogen controller 120 may include a respective processor (not shown), a respective memory (not shown), a respective disk (not shown), and a respective input/output (I/O) interface (not shown), which are each operably connected for computer communication via a respective bus (not shown) and the energy link(s) 112. The I/O interfaces provide software and hardware to facilitate data input and output between the components of the vehicle energy station 110 and other components, networks, and data sources, of the system 100. The hydrogen controller 120 may additionally include a communication device (not shown) configured to communicate with one or more components of the system 100 through a wireless communication network (network) 116. For example, the hydrogen controller 120 may be configured to send and receive communications from the remote server 114 and/or the vehicle(s) 102 that may be utilized by the hydrogen controller 120 to control the production of hydrogen at various points in time.

In an exemplary embodiment, the hydrogen controller 120 may be operable to control the production of hydrogen by one or more exemplary processes to be stored within a hydrogen storage 122 (e.g., tanks). In one or more configurations, the hydrogen controller 120 may control production of hydrogen at the vehicle energy station 110 based on one for more processes, including but not limited to, natural gas reforming, gasification, electrolysis, renewable liquid reforming, fermentation, water splitting, and the like.

The hydrogen controller 120 may control an amount of hydrogen that is produced and stored within the hydrogen storage 122 at any given time to be utilized to refuel the one or more vehicles 102 configured as HFCVs that may arrive at the vehicle energy station 110 to be re-fueled. This functionality may ensure that the vehicle energy station 110 may store a sufficient amount of hydrogen to be utilized to fuel one or more vehicles 102 that are configured as HFCVs that may be arriving at the station 110. In other words, an adequate amount of hydrogen to be stored on-hand may prevent the storage of surplus hydrogen that may not be utilized. Additionally, the adequate amount of hydrogen to be stored on-hand may prevent the shortage of hydrogen on-hand that may be needed to re-fuel one or more vehicles 102 configured as HFCVs.

In one or more embodiments, the hydrogen controller 120 may control the production of a baseline (default) amount of hydrogen during a downtime when the vehicle energy station 110 is being minimally utilized or not utilized to re-fuel one or more vehicle(s) 102 configured as HFCV(s). More specifically, the hydrogen controller 120 may be configured to control production of the baseline amount of hydrogen that is generated and stored within the hydrogen storage 122 during a downtime that includes a low hydrogen demand period. As discussed below, the amount of hydrogen generated by the vehicle energy station 110 may be increased or decreased from the baseline amount based on a potential demand for hydrogen as determined based on the arrival of one or more vehicles 102 configured as HFCVs towards the vehicle energy station 110. The hydrogen controller 120 may receive a communication to control the generation of one or more amounts of hydrogen fuel to be generated based on the determined arrival of the vehicle(s) 102 and the category of the vehicle(s) 102 as the HFCV(s) or the EV(s).

In some embodiments, the hydrogen controller 120 may additionally control the production of hydrogen based on a number of hydrogen pumps (not shown) and a number of vehicle initiated requests (e.g., initiated by drivers of the vehicles 102) for hydrogen refueling that are received from a plurality of vehicles 102 configured as HFCVs. In particular, the hydrogen controller 120 may be able to receive the vehicle initiated requests from the plurality of vehicles 102 configured as HFCVs provided through a network 116. The hydrogen controller 120 may utilize a determination of the number of hydrogen pumps, the number of received vehicle initiated requests, and a current level of hydrogen stored within the hydrogen storage 122 to respectively control the production of hydrogen. For example, if the vehicle energy station 110 includes six hydrogen pumps and receives requests for hydrogen from five approaching HFCVs that require a significant amount of hydrogen, the hydrogen controller 120 may analyze the current level of hydrogen stored within the hydrogen storage 122 and may control the production of hydrogen by the vehicle energy station 110 accordingly.

In an additional embodiment, the hydrogen controller 120 may control the production of hydrogen based on one or more variable cost/time based energy charging programs (e.g., demand response programs). In particular, one or more electrical utility providers (not shown) may provide the variable cost/time based energy charging program(s) to provide charge rates of electricity depending on a time (e.g., time of day, peak time) that the electricity is provided. Accordingly, the hydrogen controller 120 may control the production of hydrogen during a time in which the rate charged by the one or more electric providers is below a predetermined threshold (e.g., price per kilowatt-hour) in addition to or in lieu of controlling the production of hydrogen during a downtime when the vehicle energy station 110 is being minimally utilized or is not being utilized to re-fuel one or more vehicles 102 configured as HFCV(s).

In one or more embodiments, the vehicle(s) 102 and the vehicle energy station 110 may communicate with a remote server 114 via the network 116. As discussed in more detail below, the vehicle(s) 102 may transmit data including a geo-location of the vehicle(s) 102 and an energy state (e.g., amount of hydrogen contained within the hydrogen storage tank 104b) of the vehicle(s) 102 to be communicated to the remote server 114. Additionally, the remote server 114 may communicate data to the vehicle(s) 102 including a geo-location of the vehicle energy station 110 to allow a driver of the vehicle(s) 102 to navigate the vehicle(s) 102 towards the vehicle energy station 110 to be provided with energy. The remote server 114 may also communicate via the network 116 with the vehicle energy station 110. For example, as discussed below, the remote server 114 may communicate with the vehicle energy station 110 to communicate with the hydrogen controller 120 to enable the production of hydrogen at the vehicle energy station 110.

In an exemplary embodiment, the vehicle(s) 102, the hydrogen controller 120, and/or the remote server 114 may store and/or execute an energy production determinant application (energy production application) 118. As discussed in more detail below, the energy production application 118 may be utilized to determine an amount of hydrogen production to provide energy to one or more vehicles 102 configured as HFCVs that may be above, at, or below the baseline amount of hydrogen that is generated and stored within the hydrogen storage 122 during a downtime. In particular, the energy production application 118 may determine if one or more of the vehicles 102 are traveling and arriving towards the vehicle energy station 110. The energy production application 118 may additionally determine a category of the one or more vehicles 102 determined to be arriving towards the vehicle energy station 110.

The energy production application 118 may determine if the vehicle(s) 102 determined to be arriving towards the vehicle energy station 110 is categorized the HFCV(s) or the EV(s) based on its configuration. Based on the determination of the category of the vehicle(s) 102 determined to be arriving towards the vehicle energy station 110, the energy production application 118 may additionally determine an amount of hydrogen that is to be produced by the vehicle energy station 110 to accommodate the one or more vehicles 102 configured HFCVs that are determined to be arriving toward the vehicle energy station 110 to be refueled. In some embodiments, the one or more vehicles 102 that are configured as HFCVs may provide a current level of hydrogen based on the sensed level of hydrogen sensed by the hydrogen storage sensor 108 that may also be utilized by the energy production application 118 to determine the amount of hydrogen that is to be generated by the vehicle energy station 110.

In an additional embodiment, the energy production application 118 may also determine an amount of electricity that should be provided by one or more electrical utility providers (not shown) to the vehicle energy station 110 based on the category of the vehicle(s) 102 being determined as the EV(s). The energy production application 118 may determine a current charging level of the battery 104a of the vehicle(s) 102 configured as EV(s) to provide the amount of electricity that should be provided by one or more electric energy providers (e.g., electric utility provider) to the vehicle energy station 110 to accommodate the potential demand for electricity for recharging of the battery 104a of the vehicle(s) 102 configured as EV(s) that are determined to be arriving towards the vehicle energy station 110.

In one embodiment, the energy production application 118 may communicate with the one or more electric energy providers via communication between the remote server 114, the vehicle energy station 110, and/or a utility computing infrastructure 124. The utility computing infrastructure 126 may include one or more computing devices (not shown) that may communicate with the one or more energy providers. In some embodiments, the energy production application 118 may communicate with the one or more electric energy providers through the utility computing infrastructure 126 to provide a demand for electric energy that is required by the vehicle energy station 110 based on the determined arrival of one or more vehicles 102 configured as EV(s) towards the station 110.

Figure 2:
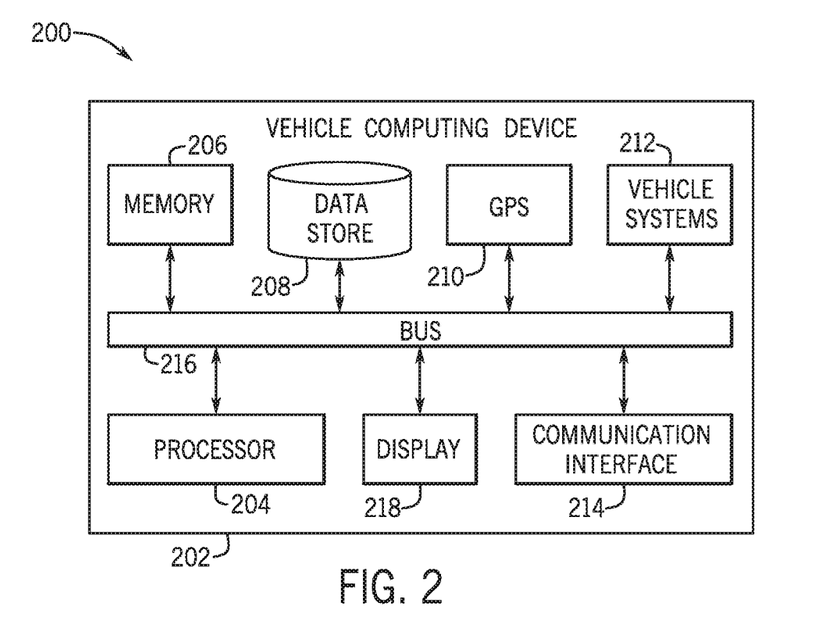
FIG. 2 is a schematic view of an illustrative vehicle architecture that is shown according to an exemplary embodiment of the present disclosure.

Referring now to FIG. 2, a schematic view of an illustrative vehicle architecture 200, for example of the vehicle(s) 102 of FIG. 1, is shown according to an exemplary embodiment of the present disclosure. In particular, the vehicle(s) 102, may include a vehicle computing device 202 (e.g., a telematics unit, an electronic control unit) with provisions for processing, communicating and interacting with various components of the vehicle(s) 102 and other components of the system 100. The vehicle computing device 202 may include a processor 204, a memory 206, a data store 208, a position determination device 210 (GPS), a plurality of vehicle systems 212 (e.g., including the electric motor 106, the battery 104a, or the hydrogen storage tank 104b) communication interface 214 and a display 218. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV may include other components and systems not shown.

In one embodiment, the data store of the vehicle(s) 102 may store application data that may also include data pertaining to the energy production application 118. The GPS 210 of the vehicle(s) 102 may provide a real-time geo-location(s) of the vehicle(s) 102. In particular, the GPS 210 may communicate the GPS/DGPS coordinates of the vehicle(s) 102 at one or more points in time that may be utilized as the geo-location(s) of the vehicle(s) 102 that may be provided at one or more points in time. As discussed below, the geo-location(s) of the vehicle(s) 102 may be utilized by the energy production application 118 to determine if/when the vehicle(s) 102 is arriving towards the vehicle energy station 110.

The communication interface 214 of the vehicle(s) 102 may provide software, firmware, and/or hardware to facilitate data input and output between the components of the vehicle computing device 202 and other components, networks and data sources. Further, the communication interface 214 may facilitate communication with external resources through the network 116 such as the remote server 114, the vehicle energy station 110, and/or the utility computing infrastructure 126. For example, the communication interface 214 may provide GPS/DGPS coordinates of the vehicle(s) 102 at one or more points in time to be processed by the energy production application 118 executed on the remote server 114. Additionally, the communication interface 214 may be utilized to provide the category of the vehicle(s) 102 as the HFCV(s) or the EV(s) that are communicated by the vehicle computing device 202 based on the existence of the battery 104a and/or the hydrogen storage tank 104b.

Figure 3:
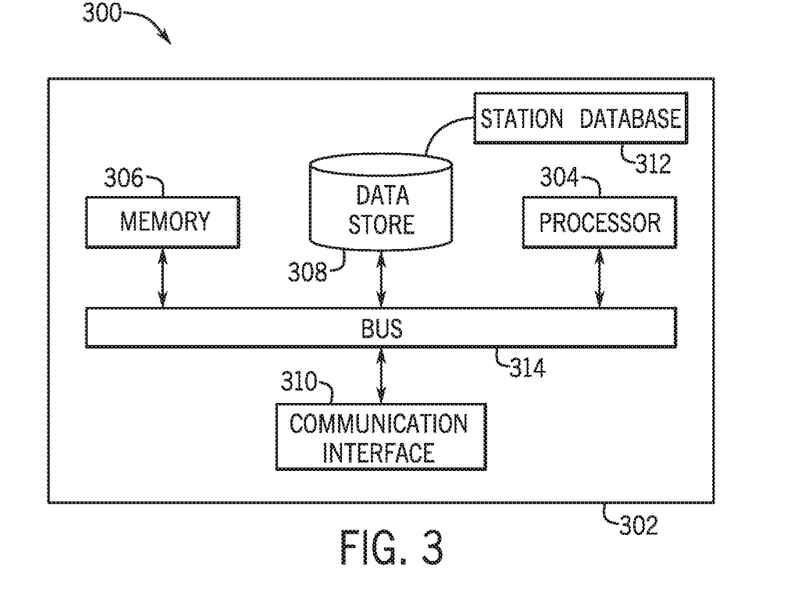
FIG. 3 is a schematic view of an illustrative remote server architecture that is shown in an exemplary embodiment of the present disclosure.

Referring now to FIG. 3, a schematic view of an illustrative remote server architecture 300, for example the remote server 114 of FIG. 1, is shown in an exemplary embodiment of the present disclosure. The remote server 114, is located remotely (i.e., off-board) from the vehicle(s) 102 (FIG. 1), and, in some embodiments may be maintained by a third party such as an Original Equipment Manufacturer (OEM) (e.g., of the vehicle(s) 102), one or more energy providers, one or more station owners, a regulatory body, among others. Additionally, in some embodiments, the remote server 114 may be another type of remote device or supported by a cloud architecture. In FIG. 3, the remote server 114 may include a computing device 302 that may further include a processor 304, a memory 306, a data store 308 and a communication interface 310. The components of the architecture 300, including the computing device 302, may be operably connected for computer communication via a bus 314 and/or other wired and wireless technologies. The computing device 302 as well as the remote server 114 may include other components and systems not shown.

In an exemplary embodiment, the communication interface 310 of the remote server 114 may provide software, firmware and/or hardware to facilitate data input and output between the components of the processor 304, the memory 306, and other components, networks and data sources associated with the remote server 114. The communication interface 310 may be utilized to communicate with the vehicle energy station 110, one or more vehicle energy stations (not shown), and/or the utility computing infrastructure 124 to maintain a station database 312 that is stored on the data store 308.

In one embodiment, the station database 312 may be configured to include records that include data associated with the vehicle energy station 110 and one or more additional vehicle energy stations. The data associated with the vehicle energy station 110 may include a name or identification number of the vehicle energy station 110 and a geo-location of the vehicle energy station 110 that may be pre-stored within the station database by one or more entities (e.g., station owner, vehicle OEM, utility provider, etc.) and/or communicated to the remote server 114 by the vehicle energy station 110 and/or the utility computing infrastructure 124. The geo-location of the vehicle energy station 110 may include GPS/DGPS coordinates associated with the location (e.g., address) at which the vehicle energy station 110 is located. As discussed below, the station database 312 may be accessed to determine the geo-location of the vehicle energy station 110 to further determine if the vehicle(s) 102 is arriving towards the vehicle energy station 110.

II. Energy Production Determinant Application

The energy production application 118 and its components will now be discussed in more detail according to an exemplary embodiment, and with continued reference to FIGS. 1-3. In one or more embodiments, the energy production application 118 may be executed by the vehicle computing device 202 of the vehicle(s) 102 and/or the computing device 302 of the remote server 114. Data may be sent or received from the energy production application 118 to/from components of the vehicle(s) 102, the remote server 114, the hydrogen controller 120 of the vehicle energy station 110, the energy link 112, and/or the utility computing infrastructure 124.

As discussed below, the energy production application 118 may be utilized to determine an amount of energy such as hydrogen that is to be produced based on the category of the vehicle(s) 102 that are determined to be arriving towards the vehicle energy station 110. This functionality may ensure that the vehicle energy station 110 produces an adequate amount of hydrogen based on the propensity of the one or more vehicles 102 that are determined to be categorized as HFCVs to be provided with energy at the vehicle energy station 110 based on their determined arrival toward the station 110. In other words, the energy production application 118 may determine an amount of hydrogen to be produced by the vehicle energy station 110 to start the production of hydrogen to accommodate the potential arrival of the vehicle(s) 102 configured as HFCVs in order to adequately fulfill the demand to refuel the vehicle(s) 102.

Figure 4:
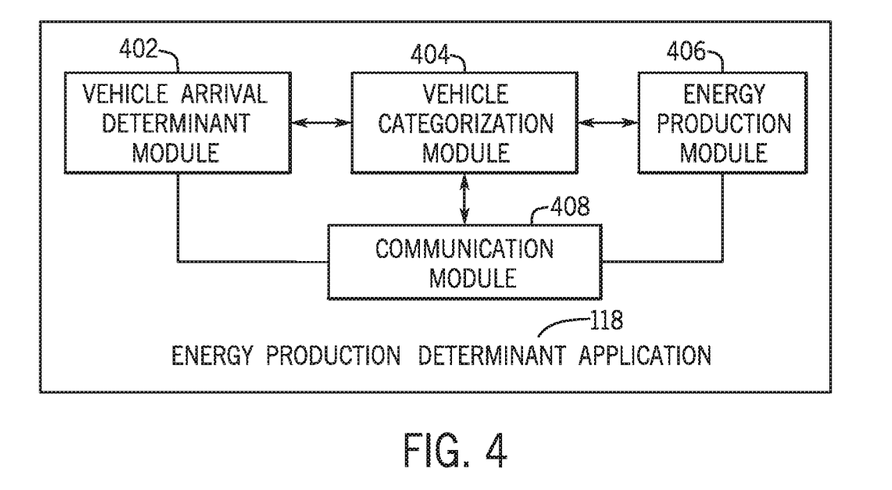
FIG. 4 is a schematic view of an illustrative energy production determinant application according to an exemplary embodiment of the present disclosure.

Referring to FIG. 4, a schematic view of an illustrative energy production application 118 according to an exemplary embodiment of the present disclosure, the energy production application 118 may include various modules to determine hydrogen production to provide energy to one or more vehicles 102 categorized as HFCVs that are determined to be arriving towards the vehicle energy station 110. In an exemplary embodiment, the energy production application 118 may include a vehicle arrival determinant module 402, a vehicle categorization module 404, an energy production module 406, and a communication module 408.

In one embodiment, the vehicle arrival determinant module 402 may be configured to receive the geo-location of the vehicle(s) 102 and determine if the vehicle(s) 102 is arriving towards the vehicle energy station 110. More specifically, the vehicle arrival determinant module 402 may access the station database 312 to retrieve the geo-location associated with the vehicle energy station 110, as previously stored within the station database 312. As discussed above, the station database 312 may contain the geo-location associated with the vehicle energy station 110 as GPS/DGPS coordinates.

In an additional embodiment, the vehicle arrival determinant module 402 may determine that the vehicle 102 is arriving towards the vehicle energy station 110 based on destination information that is inputted by a user (e.g., driver) within the vehicle 102 through a navigation system included as part of the plurality of vehicle systems 212 of the vehicle 102. The vehicle arrival determinant module 402 may utilize GPS data provided by the GPS 210 of the vehicle 102 and may access the station database 312 to retrieve the geo-location associated with the vehicle energy station 110 that is located within a route to the user's intended destination. Upon retrieving the geo-location associated with the vehicle energy station 110, the vehicle arrival determinant module 402 may communicate with the navigation system to add the vehicle energy station 110 as a navigational waypoint for providing energy to the vehicle 102 on a path of travel to the intended destination.

In one or more embodiments, upon retrieving the geo-location associated with the vehicle energy station 110, the vehicle arrival determinant module 410 may communicate with the GPS 210 through the communication interface 214 of the vehicle(s) 102 to determine if the vehicle(s) 102 is within a predetermined distance (e.g., 3 miles) of the geo-location associated with the vehicle energy station 110. The GPS 210 may provide the GPS/DGPS coordinates of the vehicle(s) 102 as the vehicle(s) 102 is traveling. Upon receiving the GPS/DGPS coordinates of the vehicle(s) 102, the vehicle arrival determinant module 402 may determine if the vehicle(s) 102 is within the predetermined distance of the geo-location associated with the vehicle energy station 110.

In one embodiment, upon determining that the vehicle(s) 102 is within the predetermined distance of the geo-location associated with the vehicle energy station 110, the vehicle arrival determinant module 402 may further determine if a distance between the geo-location of the vehicle(s) 102 and the geo-location(s) associated with the vehicle energy station 110 is decreasing. More specifically, the GPS 210 may continue to communicate GPS/DGPS coordinates of the vehicle(s) 102 to the vehicle arrival determinant module 402. The vehicle arrival determinant module 402 may analyze the GPS/DGPS coordinates of the vehicle(s) 102 and may determine the location and traveling direction of the vehicle(s) 102 as its arriving towards the vehicle energy station 110. Upon determining that the vehicle(s) 102 is arriving towards the vehicle energy station 110, the vehicle arrival determinant module 402 may communicate respective data to the vehicle categorization module 404.

In an exemplary embodiment, upon receiving the data that the vehicle(s) 102 is arriving toward the vehicle energy station 110, the vehicle categorization module 404 may communicate with the vehicle computing device 202 through the communication interface 214 to determine the category of the vehicle(s) 102. In one embodiment, the vehicle computing device 202 may provide the vehicle configuration of the vehicle(s) 102 as the HFCV(s) if the vehicle(s) 102 is configured as the HFCV(s) and includes the hydrogen storage tank 104*b*. Alternatively, the vehicle computing device 202 may provide the vehicle configuration of the vehicle(s) 102 as the EV if the vehicle(s) 102 is configured as the EV(s) and includes the battery 104*a*. Upon providing the vehicle configuration of the vehicle(s) 102 to the vehicle categorization module 404, the vehicle categorization module 404 may determine the category of the vehicle(s) 102 as the HFCV(s) or the EV(s) and may communicate the categorization to the energy production module 406.

In an exemplary embodiment, upon determining the categorization of the vehicle(s) 102 based on the communication received from the vehicle categorization module 404, if the vehicle(s) 102 is determined to be categorized as the HFCV(s), the energy production module 406 may communicate with the hydrogen controller 120 of the vehicle energy station 110 to determine a current level of hydrogen stored within the hydrogen storage 122 of the vehicle energy station 110.

In one embodiment, the energy production module 406 may communicate with the hydrogen controller 120 of the vehicle energy station 110 to determine if the hydrogen storage 122 of the vehicle energy station 110 is storing a sufficient amount of hydrogen to refuel the vehicle(s) 102 configured as HFCV(s). The energy production module 406 may additionally communicate with the vehicle computing device 202 to determine a current level of hydrogen stored within the hydrogen storage tank 104*b* of the vehicle(s) 102 to determine a required amount of hydrogen that is needed to refuel the vehicle(s) 102. The energy production module 406 may send a communication to the hydrogen controller 120 to produce hydrogen if it is determined that the amount of hydrogen that is stored within the hydrogen storage 122 of the vehicle energy station 110 is insufficient to refuel the vehicle(s) 102 based on the required amount of hydrogen that is needed to refuel the vehicle(s) 102.

In an additional embodiment, upon determining the current level of hydrogen stored within the hydrogen storage 122 of the vehicle energy station 110, the energy production module 406 may consequently determine the amount of hydrogen at a level that is to be produced above the baseline that is based on the current level of hydrogen stored within the hydrogen storage 122 of the vehicle energy station 110. In particular, the energy production module 406 may determine the level of hydrogen above the baseline that is based on the current level of hydrogen stored within the hydrogen storage 122 to accommodate the refueling of the vehicle(s) 102 configured as HFCV(s) upon arriving at the vehicle energy station 110.

In another embodiment, in addition to communicating with the hydrogen controller 120 and determining the current level of hydrogen stored within the hydrogen storage 122, the energy production module 406 may additionally communicate with the vehicle computing device 202 to determine a current level of hydrogen stored within the hydrogen storage tank 104*b* of the vehicle(s) 102. The current level of hydrogen may be provided based on the sensed level of hydrogen sensed by the hydrogen storage sensor 108. Upon determining the current level of hydrogen stored within the hydrogen storage tank 104*b* of the vehicle(s) 102, the energy production module 406 may determine an amount of hydrogen that is to be produced to refuel the vehicle(s) 102 upon its arrival to the vehicle energy station 110.

The amount of hydrogen may be determined as a level of hydrogen above the baseline that may be based on the current level of hydrogen stored within the hydrogen storage 122 of the vehicle energy station 110 and the current level of hydrogen stored within the hydrogen storage tank 104*b* of the vehicle(s) 102. Consequently, the amount of hydrogen that may be determined to be produced may be directly related to the amount of hydrogen stored on-hand by the vehicle energy station 110 and the need for an amount of hydrogen to refuel the vehicle(s) 102 based on the amount of storage capacity remaining within the hydrogen storage tank 104*b*.

In an additional embodiment, the energy production module 406 may additionally determine the amount of hydrogen that is to be produced based on the number of hydrogen pumps and the number of vehicle initiated requests for hydrogen that are received from the plurality of vehicles 102 configured as the HFCVs. The energy production module 406 may analyze the number of available hydrogen pumps at the vehicle energy station 110, the number of received vehicle initiated requests, and the amount of hydrogen stored on-hand within the hydrogen storage 122 of the vehicle energy station 110 to respectively determine the amount of hydrogen to produce.

In an alternate embodiment, energy production module 406 may additionally determine the amount of hydrogen to be produced based on the one or more variable cost/time based energy charging programs, discussed above. Accordingly, the energy production module 406 may determine the amount of hydrogen to produce during the time in which the rate charged by the one or more electric providers is below a predetermined threshold based on the amount of hydrogen stored within the hydrogen storage 122 of the vehicle energy station 110 and/or a perspective demand for hydrogen on or after the time in which the rate charged by the one or more electric providers is below the predetermined threshold.

As discussed above, in one embodiment, the vehicle arrival determinant module 402 may communicate with the navigation system to add the vehicle energy station 110 as the navigational waypoint for providing hydrogen to the vehicle(s) 102 configured as the HFCV(s). In some embodiments, upon the user inputting the intended destination and upon the addition of the vehicle energy station 110 as the navigational waypoint, the vehicle computing device 202 may present a user interface (not shown) through the display 218 within the vehicle(s) 102 that provides an indication of the current and required hydrogen level of the vehicle 102 with respect to reaching the vehicle energy station 110 associated with the navigational waypoint. In particular, the user interface may provide indication to the user if the hydrogen storage tank 104*b* of the vehicle 102 is storing a sufficient amount of hydrogen to reach the vehicle energy station 110 added as the navigational waypoint.

In one or more embodiments, the user interface may allow the user(s) to input a user interface input button (not shown) that allows the user(s) to make a vehicle initiated request(s) for hydrogen to the vehicle energy station 110 to refuel the vehicle(s) 102. Upon receiving the input to make the vehicle initiated request(s) for hydrogen, the vehicle computing device 202 may communicate the request(s) for hydrogen along with a current level of hydrogen stored within the hydrogen storage tank 104*b* of the vehicle(s) 102 to the energy production module 406. The vehicle arrival determinant module 402 may additionally communicate respective data to the energy production module 406 upon determining that the vehicle 102 is within the predetermined distance of the geo-location associated with the vehicle energy station 110. As discussed below, the energy production module 406 may utilize the respective data to the hydrogen controller 120 to determine the amount of hydrogen to be produced by the vehicle energy station 104.

In one or more embodiments, upon the addition of the vehicle energy station 110 as a navigational waypoint for providing hydrogen to the vehicle(s) 102 on the path of travel to the intended destination inputted by the user(s), the energy production module 406 may communicate with the vehicle computing device 202 of the vehicle(s) 102 to determine vehicle attributes associated with the travel of the vehicle(s) 102 as the vehicle(s) 102 arrive towards the vehicle energy station 110 added as the navigational waypoint. In one embodiment, the vehicle attributes may include an estimated arrival time to the vehicle energy station 110 as determined and provided by the navigation system of the vehicle(s) 102. The estimated arrival time may be based on the traveling speed of the vehicle(s) 102, traffic patterns between the location of the vehicle(s) 102 and the vehicle energy station 110, and environmental information (e.g., weather, construction) associated with routes determined by the navigation system of the vehicle(s) 102 as the vehicle(s) 102 arrives towards the vehicle energy station 110 added as the navigational waypoint. In some configurations, the vehicle computing device 202 may present a user interface (not shown) through the display 218 within the vehicle(s) 102 that provides the estimated arrival time to the vehicle energy station 110.

In another embodiment, the vehicle attributes may additionally include an estimated hydrogen requirement of the vehicle(s) 102 as the vehicle(s) 102 arrive toward the navigational waypoint that is based on data provided by the vehicle computing device 202 of the vehicle 102. In particular, the vehicle computing device 202 may communicate with the plurality of vehicle systems 212 of the vehicle 102 to determine a distance from the current location of the vehicle(s) 102 to the vehicle energy station 110 as provided by the navigation system of the vehicle(s) 102. In some configurations, the energy production module 406 may additionally communicate with the plurality of vehicle systems 212 to determine vehicle driving efficiency data with respect to utilization of hydrogen power. The vehicle driving efficiency may be determined by analyzing vehicle dynamics associated with the vehicle(s) 102 that include the driving speed of the vehicle(s) 102, acceleration patterns of the vehicle(s) 102, braking patterns of the vehicle(s) 102, and the like that may contribute to the usage of hydrogen by the vehicle(s) 102.

In some embodiments, the energy production module 406 may communicate with the vehicle computing device 202 to determine the current level of hydrogen stored within the hydrogen storage tank 104*b* of the vehicle(s) 102 based on the level of hydrogen sensed by the hydrogen storage sensor of the vehicle(s) 102. The energy production module 406 may additionally determine the amount of storage capacity remaining within the hydrogen storage tank 104*b*. The energy production module 406 may analyze the distance from the current location of the vehicle(s) 102 to the vehicle energy station 110 added as a navigational waypoint, the vehicle driving efficiency, and/or the current level of hydrogen stored within the hydrogen storage tank 104*b* of the vehicle(s) 102 and may estimate the amount of hydrogen required to refuel the vehicle(s) 102.

In one or more embodiments, upon determining the vehicle attributes and/or the estimated amount of hydrogen required to refuel the vehicle(s) 102, the energy production module 406 may communicate with the hydrogen controller 120 of the vehicle energy station 110 to determine a current level of hydrogen stored within the hydrogen storage 122 of the vehicle energy station 110. The energy production module 406 may utilize the vehicle attributes, the estimated amount of hydrogen required to refuel the vehicle(s) 102, and/or the current level of hydrogen stored within the hydrogen storage 122 to determine an amount of hydrogen to be produced by the vehicle energy station 110.

In one embodiment, if the vehicle(s) 102 is determined to be categorized as the EV(s), the energy production module 406 may communicate with the hydrogen controller 120 of the vehicle energy station 110 to determine a current level of hydrogen stored within the hydrogen storage 122 of the vehicle energy station 110. Based on the current level of hydrogen stored within the hydrogen storage 122, the energy production module 406 may determine an amount of hydrogen to be produced that includes a level of hydrogen that is below the baseline. Consequently, a second amount of hydrogen is produced that is less than the amount of hydrogen that may be produced when the vehicle(s) 102 that is determined to be arriving towards the vehicle energy station 110 is the HFCV(s). This functionality may ensure that an adequate amount of hydrogen will be stored on-hand within the hydrogen storage 122 that may prevent the storage of surplus hydrogen that may not be utilized.

In some embodiments, the energy production module 406 may additionally communicate with the vehicle computing device 202 to determine the current charging level of the vehicle(s) 102 categorized as the EV(s). More specifically, the energy production module 406 may determine a current charging level of the battery 104*a* of the vehicle(s) 102 configured as EV(s) to provide the amount of electricity that should be provided by the electric energy provider(s) to the vehicle energy station 110.

In one embodiment, the energy production module 406 may communicate with the one or more electric energy providers via the utility computing infrastructure 126 to provide a demand for electric energy that is required by the vehicle energy station 110 based on the determined arrival of one or more vehicles 102 configured as EV(s) towards the station 110. The communication of the demand for electric energy based on the current charging level of the battery 104*a* may be provided to accommodate the potential demand for electricity for recharging of the battery 104a of the vehicle(s) 102 configured as EV(s) upon arrival at the vehicle energy station 110.

In an exemplary embodiment, upon determining the amount of hydrogen to produce based on the category of the vehicle(s) 102, the energy production module 406 may communicate the amount of hydrogen to be produced to the communication module 408. The communication module 408 may send data directly to the hydrogen controller 120 of the vehicle energy station 110 through the network 116 or the energy link 112. The data may include the amount of hydrogen to be produced that is determined by the energy production module 406. Upon receiving the data, the hydrogen controller 120 may be operable to control the production of the amount of hydrogen by one or more exemplary processes (discussed above) to be stored within the hydrogen storage 122. Consequently, the vehicle energy station 110 may produce the amount of hydrogen as determined by the energy production module 406 and may store the amount of hydrogen within the hydrogen storage 122 to be utilized to refuel HFCVs that may include the vehicle(s) 102 that arrive at the vehicle energy station 110 to be refueled.

III. Methods Related to the Energy Production Determinant Application

Figure 5:
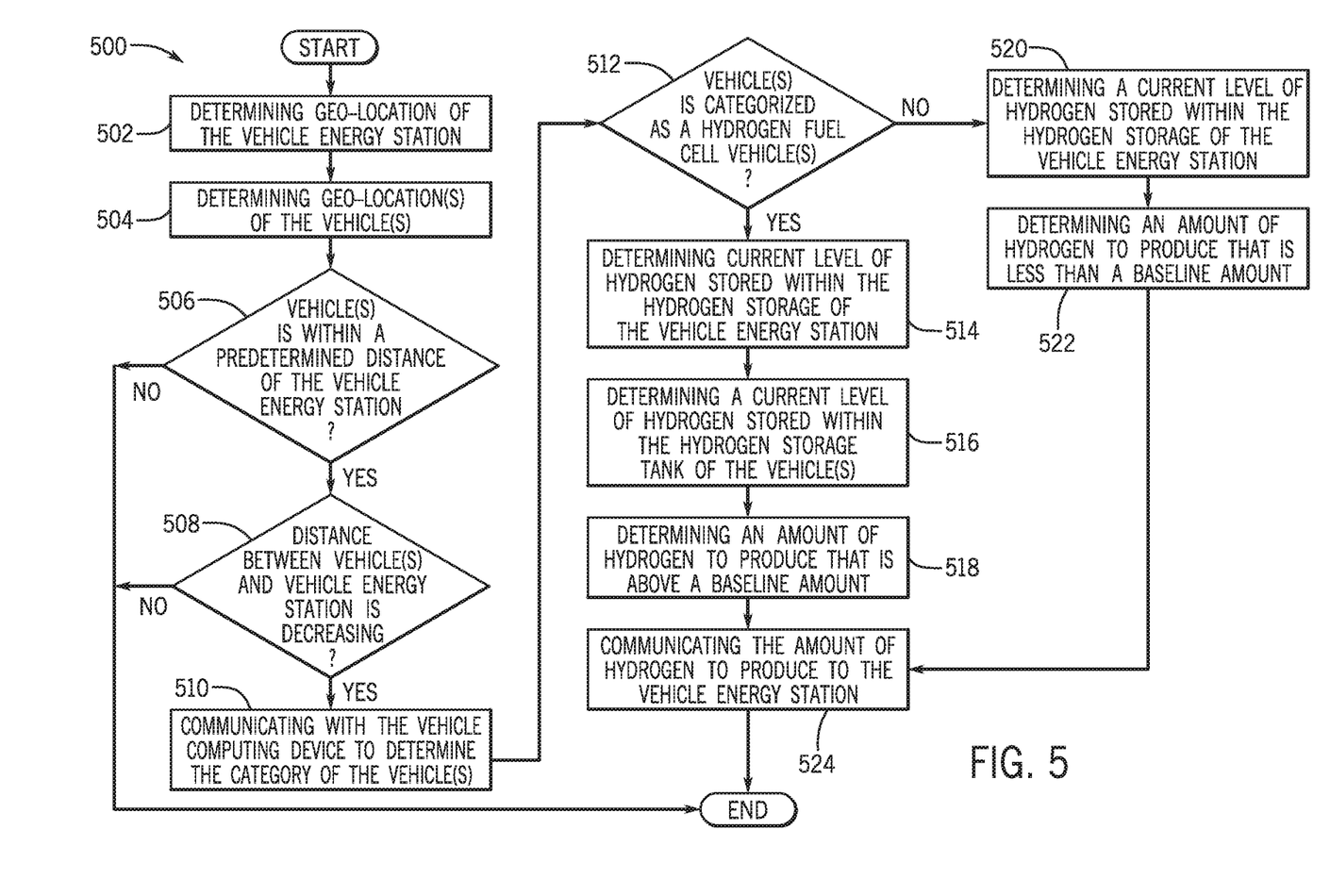
FIG. 5 is a process flow diagram of a method for determining an amount of hydrogen to produce based on the category of one or more vehicles determined to be arriving toward a vehicle energy station according to an exemplary embodiment of the present disclosure.

FIG. 5 is a process flow diagram of a method 500 for determining an amount of hydrogen to produce based on the category of one or more vehicles 102 determined to be arriving toward the vehicle energy station 110 according to an exemplary embodiment of the present disclosure. FIG. 5 will be described with reference to the components of FIGS. 1-4, though it is to be appreciated that the method 500 of FIG. 5 may be used with other system and/or components.

The method 500 may begin at block 502, wherein the method 500 may include determining a geo-location of the vehicle energy station 110. In an exemplary embodiment, the vehicle arrival determinant module 402 may access the station database 312 stored on the data store 308 of the remote server 114 to retrieve the GPS/DGPS coordinates associated with the vehicle energy station 110. In one configuration, the vehicle arrival determinant module 402 may query the station database 312 based on the name or identification number associated with the vehicle energy station 110. Upon querying the station database 312, the vehicle arrival determinant module 402 may retrieve the GPS/DGPS coordinates associated with the vehicle energy station 110. The vehicle arrival determinant module 402 may analyze the geo-location of the vehicle energy station 110 to determine the geo-location of the vehicle energy station 110.

The method 500 may proceed to block 504, wherein the method 500 may include determining a geo-location(s) of the vehicle(s) 102. In one or more embodiments, the vehicle arrival determinant module 402 may communicate with the GPS 210 of the vehicle(s) 102 through the communication interface 214. The GPS 210 may provide the GPS/DGPS coordinates associated with the location of the vehicle(s) 102 to the vehicle arrival determinant module 402. The vehicle arrival determinant module 402 may analyze the GPS/DGPS coordinates associated with the location of the vehicle(s) 102 and may determine the geo-location of the vehicle(s) 102.

The method 500 may proceed to block 506, wherein the method 500 may include determining if the vehicle(s) 102 is within a predetermined distance of the vehicle energy station 110. In one embodiment, upon determining the geo-locations of the vehicle energy station 110 and the vehicle(s) 102, the vehicle arrival determinant module 402 may compare the respective geo-locations. The vehicle arrival determinant module 402 may utilize mapping data (not shown) to determine if the vehicle(s) 102 is within a predetermined distance (e.g., 3 miles) of the vehicle energy station 110 based on the comparison of respective geo-locations and data associated with a map of a vicinity of the vehicle energy station 110 (as derived from the map data). The vehicle arrival determinant module 402 may consequently determine if the vehicle(s) 102 is within the predetermined distance of the vehicle energy station 110.

If it is determined that the vehicle(s) 102 is within the predetermined distance of the vehicle energy station 110, the method 500 may proceed to block 508, wherein the method 500 may include determining if the distance between the vehicle(s) 102 and the vehicle energy station 110 is decreasing. In one or more embodiments, upon determining that the vehicle(s) 102 is within the predetermined distance of the geo-location associated with the vehicle energy station 110, the vehicle arrival determinant module 402 may further communicate with the GPS 210 to receive the GPS/DGPS coordinates of the vehicle(s) 102.

The vehicle arrival determinant module 402 may analyze the GPS/DGPS coordinates of the vehicle(s) 102 and may determine that the vehicle(s) 102 is arriving towards the vehicle energy station(s) if the distance between the geo-location(s) of the vehicle(s) 102 and the geo-location of the vehicle energy station 110 is decreasing. In some embodiments, the vehicle arrival determinant module 402 may additionally determine the location and traveling direction of the vehicle(s) 102 based on the GPS/DGPS coordinates of the vehicle(s) 102 and the mapping data to determine that the vehicle(s) 102 is arriving towards the vehicle energy station 110 (e.g., there is a high propensity that the vehicle(s) 102 will arrive at the station 110 to be refueled/recharged).

If it is determined that the distance between the vehicle(s) 102 and the vehicle energy station 110 is decreasing (at block 508), the method 500 may proceed to block 510, wherein the method 500 may include communicating with the vehicle computing device 202 to determine the category of the vehicle(s) 102. In one embodiment, upon determining that the vehicle(s) 102 is arriving towards the vehicle energy station 110, the vehicle arrival determinant module 402 may communicate respective data to the vehicle categorization module 404. The vehicle categorization module 404 may responsively communicate with the vehicle computing device 202 of the vehicle(s) 102 to determine the category of the vehicle(s) 102. The vehicle computing device 202 may communicate the vehicle configuration of the vehicle(s) 102 as the HFCV(s) or the EV(s) based on the configuration of the vehicle(s) 102.

The method 500 may proceed to block 512, wherein the method 500 includes determining if the vehicle(s) 102 is categorized as a hydrogen fuel cell vehicle(s). Upon the vehicle computing device 202 providing the vehicle configuration of the vehicle(s) 102 to the vehicle categorization module 404, the vehicle categorization module 404 may consequently determine the category of the vehicle(s) 102 as the HFCV(s) or the EV(s). If it is determined that the vehicle(s) 102 is categorized as a HFCV(s) (at block 512), the method 500 may proceed to block 514.

At block 514, the method 500 may include determining a current level of hydrogen stored within the hydrogen storage 122 of the vehicle energy station 110. In an exemplary embodiment, upon determining the categorization of the vehicle(s) 102 as the HFCV(s), the vehicle categorization module 404 may communicate the category of the vehicle(s) 102 to the energy production module 406. The energy production module 406 may responsively communicate with the hydrogen controller 120 of the vehicle energy station 110 to determine a current level of hydrogen stored within the hydrogen storage 122 of the vehicle energy station 110.

The method 500 may proceed to block 516, wherein the method 500 may include determining a current level of hydrogen stored within the hydrogen storage tank 104*b* of the vehicle(s) 102. In one embodiment, the energy production module 406 may communicate with the vehicle computing device 202 to determine the current level of hydrogen stored within the hydrogen storage tank 104*b* of the vehicle(s) 102. As discussed above, the vehicle computing device 202 may provide the current level of hydrogen stored within the hydrogen storage tank 104*b* based on the level of hydrogen sensed by the hydrogen storage sensor of the vehicle(s) 102.

The method 500 may proceed to block 518, wherein the method 500 may include determining an amount of hydrogen to produce that is above a baseline amount. In an exemplary embodiment, upon determining the current level of hydrogen stored within the hydrogen storage tank 104*b* of the vehicle(s) 102, the energy production module 406 may determine an amount of hydrogen that is to be produced to refuel the vehicle(s) 102 upon its arrival to the vehicle energy station 110. The amount of hydrogen may be determined as a level of hydrogen above the baseline that may be based on the current level of hydrogen stored within the hydrogen storage 122 of the vehicle energy station 110 and the current level of hydrogen stored within the hydrogen storage tank 104*b* of the vehicle(s) 102. In other words, the energy production module 406 may determine an amount of hydrogen that may fulfill the potential demand of hydrogen to refuel the vehicle(s) 102 determined to be categorized as HFCV(s) that are determined to be arriving towards the station 110 based on the amount of hydrogen on-hand and the hydrogen needed by the vehicle(s) 102.

The method 500 may proceed to block 524, wherein the method 500 may include communicating the amount of hydrogen to produce to the vehicle energy station 110. In one embodiment, upon determining the amount of hydrogen to produce, the energy production module 406 may communicate the determined amount to the communication module 408. The communication module 408 may send data directly to the hydrogen controller 120 of the vehicle energy station 110 that includes the determined amount. The vehicle energy station 110 may produce the amount of hydrogen as determined by the energy production module 406 and may store the amount of hydrogen within the hydrogen storage 122 to be utilized to refuel HFCVs that may include the vehicle(s) 102 that arrive at the vehicle energy station 110 to be refueled.

With reference again to block 512 of the method 500, if the vehicle(s) 102 is not categorized as the HFCV(s) and is instead categorized as the EV(s), the method 500 may proceed to block 520, wherein the method 500 may include determining a current level of hydrogen stored within the hydrogen storage of the vehicle energy station 110. Upon determining the categorization of the vehicle(s) 102 as the EV(s), the vehicle categorization module 404 may communicate the category of the vehicle(s) 102 to the energy production module 406. The energy production module 406 may responsively communicate with the hydrogen controller 120 of the vehicle energy station 110 to determine a current level of hydrogen stored within the hydrogen storage 122 of the vehicle energy station 110.

The method 500 may proceed to block 522, wherein the method 500 may include determining an amount of hydrogen to produce that is less than a baseline amount. In an exemplary embodiment, upon determining the current level of hydrogen stored within the hydrogen storage 122 of the vehicle energy station 110, the energy production module 406 may determine an amount of hydrogen to be produced that includes a level of hydrogen that is below the baseline. Consequently, a second amount of hydrogen may be determined to be produced that is less than the amount of hydrogen that may be produced when the vehicle(s) 102 that is determined to be arriving towards the vehicle energy station 110 is the HFCV(s).

The method 500 may proceed to block 524, wherein the method 500 may include communicating the amount of hydrogen to produce to the vehicle energy station 110. As discussed above, the communication module 408 may send data directly to the hydrogen controller 120 of the vehicle energy station 110 that includes the determined amount. The vehicle energy station 110 may be controlled by the hydrogen controller 120 to produce the amount of hydrogen as determined by the energy production module 406 and may store the amount of hydrogen within the hydrogen storage 122 to be stored to be utilized for refueling at a future point in time.

Figure 6:
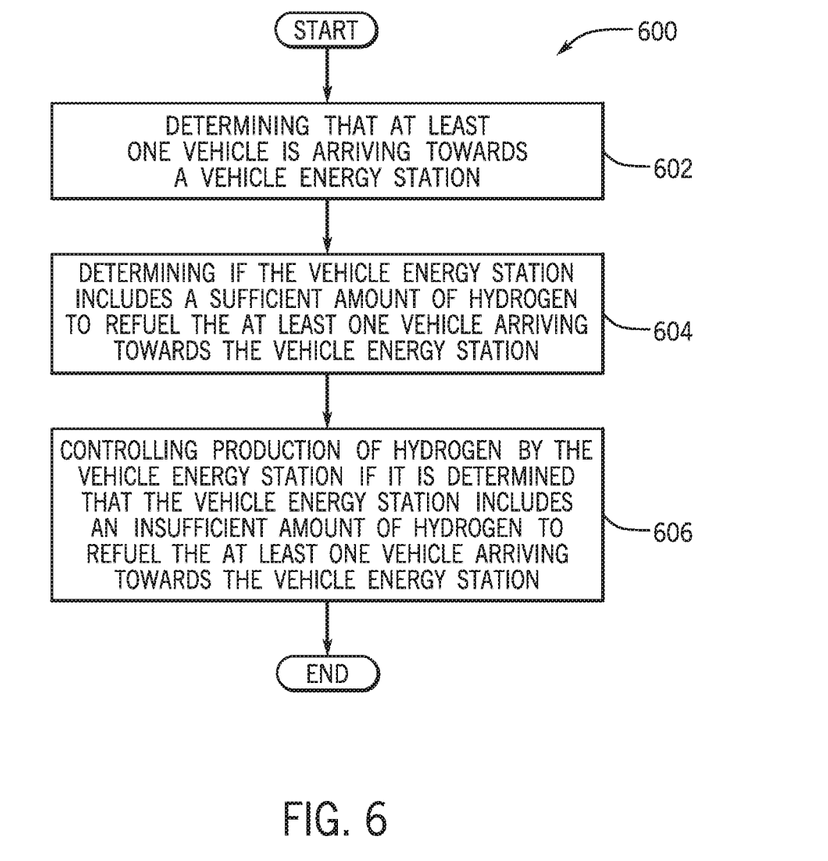
FIG. 6 is a process flow diagram of a method for determining hydrogen production to provide energy to at least one vehicle according to an exemplary embodiment of the present disclosure.

FIG. 6 is a process flow diagram of a method 600 for determining hydrogen production to provide energy to at least one vehicle 102 according to an exemplary embodiment of the present disclosure. FIG. 6 will be described with reference to the components of FIGS. 1-4, though it is to be appreciated that the method 600 of FIG. 6 may be used with other system and/or components. The method 600 may begin at block 602, wherein the method 600 may include determining that at least one vehicle 102 is arriving towards a vehicle energy station 110. The method 600 may proceed to block 604, wherein the method 600 may include determining if the vehicle energy station 110 includes a sufficient amount of hydrogen to refuel the at least one vehicle 102 arriving towards the vehicle energy station 110. The method 600 may proceed to block 606, wherein the method 600 includes controlling production of hydrogen by the vehicle energy station 110 if it is determined that the vehicle energy station 110 includes an insufficient amount of hydrogen to refuel the at least one vehicle 102 arriving towards the vehicle energy station 110.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Additionally, it will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for determining hydrogen production to provide energy to at least one vehicle, comprising:
    determining that at least one vehicle is arriving towards a vehicle energy station, wherein determining that the at least one vehicle is arriving towards the vehicle energy station includes determining a geo-location of the at least one vehicle, wherein the geo-location of the at least one vehicle is determined based on global positioning system (GPS) coordinates of the at least one vehicle;
    determining if the vehicle energy station includes a sufficient amount of hydrogen to refuel the at least one vehicle arriving towards the vehicle energy station, wherein determining if the vehicle energy station includes the sufficient amount of hydrogen includes comparing a current level of hydrogen stored within a hydrogen storage tank of the at least one vehicle and a current level of hydrogen stored within a hydrogen storage of the vehicle energy station and determining if an amount of hydrogen is to be produced that is above a baseline amount of hydrogen, wherein the baseline amount of hydrogen includes an amount of hydrogen that is generated and stored during a low hydrogen demand period for the vehicle energy station; and
    controlling production of hydrogen by the vehicle energy station if it is determined that the vehicle energy station includes an insufficient amount of hydrogen to refuel the at least one vehicle arriving towards the vehicle energy station, wherein controlling production of the hydrogen by the vehicle energy station includes producing an amount of hydrogen that is above the baseline amount of hydrogen, wherein the amount of hydrogen that is above the baseline amount of hydrogen is based on the current level of hydrogen stored within the hydrogen storage tank of the at least one vehicle and the current level of hydrogen stored within a hydrogen storage of the vehicle energy station.

2. The computer-implemented method of claim 1, wherein determining that the at least one vehicle is arriving towards the vehicle energy station includes determining a geo-location of the vehicle energy station.

3. The computer-implemented method of claim 2, wherein determining that the at least one vehicle is arriving towards the vehicle energy station includes comparing the geo-location of the vehicle energy station and the geo-location of the vehicle and determining that the at least one vehicle is within a predetermined distance of the vehicle energy station.

4. The computer-implemented method of claim 3, wherein determining that the at least one vehicle is arriving towards the vehicle energy station includes determining that a distance between the geo-location of the vehicle energy station and the at least one vehicle is decreasing as the vehicle is traveling, wherein communication with a vehicle computing device of the at least one vehicle to determine a category of the at least one vehicle occurs upon determining that the distance between the geo-location of the vehicle energy station and the at least one vehicle is decreasing.

5. The computer-implemented method of claim 1, further including determining if the at least one vehicle is or is not categorized as a hydrogen fuel cell vehicle (HFCV) based on electronic communication with a vehicle computing device of the at least one vehicle.

6. The computer-implemented method of claim 1, further including determining an addition of the vehicle energy station as a navigational waypoint on a path of travel to an intended destination, wherein a user interface is presented within the vehicle to make a vehicle initiated request for hydrogen, wherein the vehicle initiated request is communicated from the vehicle to the vehicle energy station.

7. The computer-implemented method of claim 6, wherein determining if the vehicle energy station includes the sufficient amount of hydrogen includes utilizing vehicle attributes associated with a travel of the vehicle and the current level of hydrogen stored within the hydrogen storage of the vehicle energy station to determine the amount of hydrogen to produce, wherein the vehicle attributes include an estimated time of arrival of the at least one vehicle to the vehicle energy station added as the navigational waypoint and an estimated hydrogen requirement of the at least one vehicle as the at least one vehicle arrives toward the vehicle energy station added as the navigational waypoint.

8. The computer-implemented method of claim 1, wherein controlling production of hydrogen by the vehicle energy station includes communicating an amount of hydrogen to be produced to the vehicle energy station, wherein the vehicle energy station produces the amount of hydrogen to refuel the at least one vehicle.

9. A system for determining hydrogen production to provide energy to at least one vehicle, comprising:
    a memory storing instructions when executed by a processor cause the processor to:
    determine that at least one vehicle is arriving towards a vehicle energy station, wherein determining that the at least one vehicle is arriving towards the vehicle energy station includes determining a geo-location of the at least one vehicle, wherein the geo-location of the at least one vehicle is determined based on global positioning system (GPS) coordinates of the at least one vehicle;
    determine if the vehicle energy station includes a sufficient amount of hydrogen to refuel the at least one vehicle arriving towards the vehicle energy station, wherein determining if the vehicle energy station includes the sufficient amount of hydrogen includes comparing a current level of hydrogen stored within a hydrogen storage tank of the at least one vehicle and a current level of hydrogen stored within a hydrogen storage of the vehicle energy station and determining if an amount of hydrogen is to be produced that is above a baseline amount of hydrogen, wherein the baseline amount of hydrogen includes an amount of hydrogen that is generated and stored during a low hydrogen demand period for the vehicle energy station; and
    control production of hydrogen by the vehicle energy station if it is determined that the vehicle energy station includes an insufficient amount of hydrogen to refuel the at least one vehicle arriving towards the vehicle energy station, wherein controlling production of the hydrogen by the vehicle energy station includes producing an amount of hydrogen that is above the baseline amount of hydrogen, wherein the amount of hydrogen that is above the baseline amount of hydrogen is based on the current level of hydrogen stored within the hydrogen storage tank of the at least one vehicle and the current level of hydrogen stored within a hydrogen storage of the vehicle energy station.

10. The system of claim 9, wherein determining that the at least one vehicle is arriving towards the vehicle energy station includes determining a geo-location of the vehicle energy station.

11. The system of claim 10, wherein determining that the at least one vehicle is arriving towards the vehicle energy station includes comparing the geo-location of the vehicle energy station and the geo-location of the vehicle and determining that the at least one vehicle is within a predetermined distance of the vehicle energy station.

12. The system of claim 11, wherein determining that the at least one vehicle is arriving towards the vehicle energy station includes determining that a distance between the geo-location of the vehicle energy station and the at least one vehicle is decreasing as the vehicle is traveling, wherein communication with a vehicle computing device of the at least one vehicle to determine a category of the at least one vehicle occurs upon determining that the distance between the geo-location of the vehicle energy station and the at least one vehicle is decreasing.

13. The system of claim 9, further including determining if the at least one vehicle is or is not categorized as a hydrogen fuel cell vehicle (HFCV) based on electronic communication with a vehicle computing device of the at least one vehicle.

14. The system of claim 9, further including determining an addition of the vehicle energy station as a navigational waypoint on a path of travel to an intended destination, wherein a user interface is presented within the vehicle to make a vehicle initiated request for hydrogen, wherein the vehicle initiated request is communicated from the vehicle to the vehicle energy station.

15. The system of claim 14, wherein determining if the vehicle energy station includes the sufficient amount of hydrogen includes utilizing vehicle attributes associated with a travel of the vehicle and the current level of hydrogen stored within the hydrogen storage of the vehicle energy station to determine the amount of hydrogen to produce, wherein the vehicle attributes include an estimated time of arrival of the at least one vehicle to the vehicle energy station added as the navigational waypoint and an estimated hydrogen requirement of the at least one vehicle as the at least one vehicle arrives toward the vehicle energy station added as the navigational waypoint.

16. The system of claim 9, wherein controlling production of hydrogen by the vehicle energy station includes communicating an amount of hydrogen to be produced to the vehicle energy station, wherein the vehicle energy station produces the amount of hydrogen to refuel the at least one vehicle.

17. A non-transitory computer readable storage medium storing instructions that when executed by a computer, which includes a processor, perform a method, the method comprising:
  determining that at least one vehicle is arriving towards a vehicle energy station, wherein determining that the at least one vehicle is arriving towards the vehicle energy station includes determining a geo-location of the at least one vehicle, wherein the geo-location of the at least one vehicle is determined based on global positioning system (GPS) coordinates of the at least one vehicle;
  determining if the vehicle energy station includes a sufficient amount of hydrogen to refuel the at least one vehicle arriving towards the vehicle energy station, wherein determining if the vehicle energy station includes the sufficient amount of hydrogen includes comparing a current level of hydrogen stored within a hydrogen storage tank of the at least one vehicle and a current level of hydrogen stored within a hydrogen storage of the vehicle energy station and determining if an amount of hydrogen is to be produced that is above a baseline amount of hydrogen, wherein the baseline amount of hydrogen includes an amount of hydrogen that is generated and stored during a low hydrogen demand period for the vehicle energy station; and
  controlling production of hydrogen by the vehicle energy station if it is determined that the vehicle energy station includes an insufficient amount of hydrogen to refuel the at least one vehicle arriving towards the vehicle energy station, wherein controlling production of the hydrogen by the vehicle energy station includes producing an amount of hydrogen that is above the baseline amount of hydrogen, wherein the amount of hydrogen that is above the baseline amount of hydrogen is based on the current level of hydrogen stored within the hydrogen storage tank of the at least one vehicle and the current level of hydrogen stored within a hydrogen storage of the vehicle energy station.

18. The non-transitory computer readable storage medium of claim 17, wherein controlling production of hydrogen by the vehicle energy station includes communicating an amount of hydrogen to be produced to the vehicle energy station, wherein the vehicle energy station produces the amount of hydrogen to refuel the at least one vehicle.

* * * * *